(12) United States Patent
Diaz et al.

(10) Patent No.: US 11,474,393 B2
(45) Date of Patent: Oct. 18, 2022

(54) LIGHTING ASSEMBLY FOR ELECTRONIC DISPLAY AND GRAPHIC

(71) Applicant: Manufacturing Resources International, Inc., Alpharetta, GA (US)

(72) Inventors: Marcos Diaz, Alpharetta, GA (US); William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 162 days.

(21) Appl. No.: 16/839,451

(22) Filed: Apr. 3, 2020

(65) Prior Publication Data

US 2020/0233265 A1 Jul. 23, 2020

Related U.S. Application Data

(63) Continuation of application No. 14/878,679, filed on Oct. 8, 2015, now Pat. No. 10,649,273.

(60) Provisional application No. 62/061,512, filed on Oct. 8, 2014.

(51) Int. Cl.
| | |
|---|---|
| *A47F 3/04* | (2006.01) |
| *G02F 1/13357* | (2006.01) |
| *A47F 11/10* | (2006.01) |
| *F21V 8/00* | (2006.01) |

(52) U.S. Cl.
CPC ...... *G02F 1/133603* (2013.01); *A47F 3/0404* (2013.01); *A47F 3/0434* (2013.01); *A47F 11/10* (2013.01); *G02B 6/0091* (2013.01)

(58) Field of Classification Search
None
See application file for complete search history.

(56) References Cited

U.S. PATENT DOCUMENTS

| | | |
|---|---|---|
| 1,812,919 A | 7/1931 | Balder |
| 3,510,973 A | 5/1970 | Mazzocco, Sr. |
| 3,629,972 A | 12/1971 | Rehberg et al. |
| 4,040,726 A | 8/1977 | Paca |
| 4,257,084 A | 3/1981 | Reynolds |

(Continued)

FOREIGN PATENT DOCUMENTS

| | | |
|---|---|---|
| AU | 2004283319 A1 | 5/2005 |
| AU | 2007216782 A1 | 9/2007 |

(Continued)

OTHER PUBLICATIONS

A. Vogler & H. Kunkley, Photochemistry and Beer, Jan. 1982, 3 Pages, vol. 59, No. 1.

(Continued)

*Primary Examiner* — Thanh Nhan P Nguyen
(74) *Attorney, Agent, or Firm* — Standley Law Group LLP; Jeffrey S. Standley; Adam J. Smith

(57) ABSTRACT

A transparent electronic display layer is placed between a front and rear transparent layer. A light guide is positioned behind the transparent electronic display layer and has an outer edge. Lighting elements are positioned adjacent to the outer edge. A cavity is positioned adjacent to and on an opposing side of the lighting elements as compared to the light guide such that light exiting the lighting elements enters both the light guide and the cavity. A graphic may be provided at the cavity.

12 Claims, 7 Drawing Sheets

(56) References Cited

U.S. PATENT DOCUMENTS

| | | |
|---|---|---|
| 1,299,092 A | 11/1981 | Ibrahim |
| 4,371,870 A | 2/1983 | Biferno |
| 4,738,042 A | 4/1988 | Corden et al. |
| 4,804,953 A | 2/1989 | Castleberry |
| 4,853,678 A | 8/1989 | Bishop, Jr. et al. |
| 4,950,344 A | 8/1990 | Glover et al. |
| 5,040,878 A | 8/1991 | Eichenlaub |
| 5,046,805 A | 9/1991 | Simon |
| 5,066,106 A | 11/1991 | Sakamoto et al. |
| 5,363,149 A | 11/1994 | Furuno et al. |
| 5,365,354 A | 11/1994 | Jannson et al. |
| 5,372,416 A | 12/1994 | Shapley et al. |
| 5,381,309 A | 1/1995 | Borchardt |
| 5,440,324 A | 8/1995 | Strickling, III et al. |
| 5,453,855 A | 9/1995 | Nakamura et al. |
| 5,528,720 A | 6/1996 | Winston et al. |
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,409,356 B1 | 6/2002 | Nishimura |
| 6,419,372 B1 | 7/2002 | Shaw et al. |
| 6,421,103 B2 | 7/2002 | Yamaguchi |
| 6,437,673 B1 | 8/2002 | Nishida et al. |
| 6,446,467 B1 | 9/2002 | Lieberman et al. |
| 6,481,130 B1 | 11/2002 | Wu |
| 6,556,258 B1 | 4/2003 | Yoshida et al. |
| 6,601,984 B2 | 8/2003 | Yamamoto et al. |
| 6,636,003 B2 | 10/2003 | Rahm et al. |
| 6,683,639 B2 | 1/2004 | Driessen-Olde Scheper et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 6,982,686 B2 | 1/2006 | Miyachi et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,053,557 B2 | 5/2006 | Cross et al. |
| 7,057,590 B2 | 6/2006 | Lim et al. |
| 7,178,963 B2 | 2/2007 | Ueda et al. |
| 7,190,416 B2 | 3/2007 | Paukshto et al. |
| 7,194,158 B2 | 3/2007 | Schultheis et al. |
| 7,210,839 B2 | 5/2007 | Jung et al. |
| 7,218,812 B2 | 5/2007 | Maxwell et al. |
| 7,232,250 B2 | 6/2007 | Chuang |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,324,080 B1 | 1/2008 | Hu et al. |
| 7,327,416 B2 | 2/2008 | Lee et al. |
| 7,347,706 B1 | 3/2008 | Wu et al. |
| 7,352,940 B2 | 4/2008 | Charters et al. |
| 7,375,381 B2 | 5/2008 | Shimizu et al. |
| 7,413,233 B1 | 8/2008 | Jung |
| 7,421,167 B2 | 9/2008 | Charters et al. |
| 7,427,140 B1 | 9/2008 | Ma |
| 7,455,412 B2 | 11/2008 | Rottcher |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,542,108 B2 | 6/2009 | Saito et al. |
| 7,546,009 B2 | 6/2009 | Kukulj et al. |
| 7,682,047 B2 | 3/2010 | Hsu et al. |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,853,288 B2 | 12/2010 | Ma |
| 7,922,381 B2 | 4/2011 | Han et al. |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,125,163 B2 | 2/2012 | Dunn et al. |
| 8,194,031 B2 | 6/2012 | Yao et al. |
| 8,233,115 B2 | 7/2012 | Hadlich et al. |
| 8,254,121 B2 | 8/2012 | Lee et al. |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,417,376 B1 | 4/2013 | Smolen |
| 8,508,155 B2 | 8/2013 | Schuch |
| 8,529,993 B2 | 9/2013 | Charters et al. |
| 8,578,081 B1 | 11/2013 | Fils |
| 8,648,993 B2 | 2/2014 | Dunn et al. |
| 8,674,390 B2 | 3/2014 | Harris et al. |
| 8,674,963 B2 | 3/2014 | Cornish et al. |
| 8,683,745 B2 | 4/2014 | Artwohl et al. |
| 8,803,790 B2 | 8/2014 | Wasinger et al. |
| 8,829,815 B2 | 9/2014 | Dunn et al. |
| 8,842,366 B2 | 9/2014 | Arnett et al. |
| 8,982,013 B2 | 3/2015 | Sako et al. |
| 8,988,635 B2 | 3/2015 | Dunn et al. |
| 9,030,129 B2 | 5/2015 | Dunn et al. |
| 9,052,536 B2 | 6/2015 | Artwohl et al. |
| 9,141,329 B1 | 9/2015 | Reicher et al. |
| 9,155,405 B2 | 10/2015 | Artwohl et al. |
| 9,167,655 B2 | 10/2015 | Dunn et al. |
| 9,173,509 B2 | 11/2015 | Mischel, Jr. et al. |
| 9,348,174 B2 | 5/2016 | Dunn et al. |
| 9,500,801 B2 | 11/2016 | Dunn |
| 9,500,896 B2 | 11/2016 | Dunn et al. |
| 9,514,661 B2 | 12/2016 | Riegel |
| 9,519,185 B2 | 12/2016 | Dunn et al. |
| 9,526,352 B2 | 12/2016 | Dunn et al. |
| 9,535,293 B2 | 1/2017 | Dunn |
| 9,633,366 B2 | 4/2017 | Dunn |
| 9,661,939 B2 | 5/2017 | Dunn et al. |
| 9,684,124 B2 | 6/2017 | Dunn |
| 9,733,420 B2 | 8/2017 | Dunn et al. |
| 9,812,047 B2 | 11/2017 | Schuch et al. |
| 9,832,847 B2 | 11/2017 | Dunn et al. |
| 9,867,253 B2 | 1/2018 | Dunn et al. |
| 9,881,528 B2 | 1/2018 | Dunn |
| 9,924,583 B2 | 3/2018 | Schuch et al. |
| 9,983,427 B2 | 5/2018 | Dunn |
| 10,052,026 B1 | 8/2018 | Tran |
| 10,126,579 B2 | 11/2018 | Dunn et al. |
| 10,182,665 B2 | 1/2019 | Dunn et al. |
| 10,191,212 B2 | 1/2019 | Dunn |
| 10,258,170 B2 | 4/2019 | Dunn et al. |
| 10,261,362 B2 | 4/2019 | Brown et al. |
| 10,269,038 B2 | 4/2019 | Dunn |
| 10,274,769 B2 | 4/2019 | Kil et al. |
| 10,290,786 B2 | 5/2019 | Hong et al. |
| 10,297,178 B2 | 5/2019 | Park et al. |
| 10,338,423 B2 | 7/2019 | Baek et al. |
| 10,417,943 B2 | 9/2019 | Dunn |
| 10,431,166 B2 | 10/2019 | Wasinger et al. |
| 10,455,671 B2 | 10/2019 | Dunn et al. |
| 10,466,539 B2 | 11/2019 | Dunn et al. |
| 10,467,844 B2 | 11/2019 | Diaz |
| 10,527,276 B2 | 1/2020 | Dunn et al. |
| 10,555,406 B2 | 2/2020 | Dunn et al. |
| 10,595,648 B2 | 3/2020 | Dunn et al. |
| 2001/0009508 A1 | 7/2001 | Umemoto et al. |
| 2001/0033726 A1 | 10/2001 | Shie et al. |

(56) References Cited

U.S. PATENT DOCUMENTS

| | | |
|---|---|---|
| 2002/0043012 A1 | 4/2002 | Shibata et al. |
| 2002/0064037 A1 | 5/2002 | Lee |
| 2002/0075552 A1 | 6/2002 | Poll et al. |
| 2002/0126078 A1 | 9/2002 | Horibe et al. |
| 2002/0187575 A1 | 12/2002 | Maruyama et al. |
| 2003/0026085 A1 | 2/2003 | Ueda |
| 2003/0043312 A1 | 3/2003 | Nishida et al. |
| 2003/0062813 A1 | 4/2003 | Cording |
| 2003/0117790 A1 | 6/2003 | Lee et al. |
| 2003/0139169 A1 | 7/2003 | Arreasola, Jr. |
| 2003/0227428 A1 | 12/2003 | Nose |
| 2004/0062029 A1 | 4/2004 | Ato |
| 2004/0113044 A1 | 6/2004 | Ishiguchi |
| 2004/0148055 A1 | 7/2004 | Shoenfeld |
| 2004/0160388 A1 | 8/2004 | O'Keeffe |
| 2005/0094391 A1 | 5/2005 | Campbell et al. |
| 2005/0105303 A1 | 5/2005 | Emde |
| 2005/0117323 A1 | 6/2005 | King |
| 2005/0140848 A1 | 6/2005 | Yoo et al. |
| 2005/0162737 A1 | 7/2005 | Whitehead et al. |
| 2005/0195972 A1 | 9/2005 | Barr |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0072299 A1 | 4/2006 | Lai |
| 2006/0077686 A1 | 4/2006 | Han et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0092618 A1 | 5/2006 | Tanaka et al. |
| 2006/0125418 A1 | 6/2006 | Bourgault |
| 2006/0197474 A1 | 9/2006 | Olsen |
| 2006/0215958 A1 | 9/2006 | Yeo et al. |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0284788 A1 | 12/2006 | Robinson et al. |
| 2006/0289201 A1 | 12/2006 | Kim et al. |
| 2007/0001997 A1 | 1/2007 | Kim et al. |
| 2007/0013647 A1 | 1/2007 | Lee et al. |
| 2007/0013828 A1 | 1/2007 | Cho et al. |
| 2007/0021217 A1 | 1/2007 | Wu |
| 2007/0047214 A1 | 3/2007 | Nesterenko et al. |
| 2007/0070615 A1 | 3/2007 | Joslin et al. |
| 2007/0097321 A1 | 5/2007 | Whitehead et al. |
| 2007/0115686 A1 | 5/2007 | Tyberghien |
| 2007/0127144 A1 | 6/2007 | Gao |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0151274 A1 | 7/2007 | Roche et al. |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0171647 A1 | 7/2007 | Artwohl et al. |
| 2007/0171676 A1 | 7/2007 | Chang |
| 2007/0177071 A1 | 8/2007 | Egi et al. |
| 2007/0195535 A1 | 8/2007 | Artwohl et al. |
| 2007/0198638 A1 | 8/2007 | Omura et al. |
| 2007/0206158 A1 | 9/2007 | Kinoshita et al. |
| 2007/0214812 A1 | 9/2007 | Wagner et al. |
| 2007/0222910 A1 | 9/2007 | Hu |
| 2007/0230218 A1 | 10/2007 | Jachim et al. |
| 2007/0268234 A1 | 11/2007 | Wakabayashi et al. |
| 2007/0288332 A1 | 12/2007 | Naito |
| 2007/0297163 A1 | 12/2007 | Kim et al. |
| 2007/0297172 A1 | 12/2007 | Furukawa et al. |
| 2008/0019147 A1 | 1/2008 | Erchak et al. |
| 2008/0024047 A1 | 1/2008 | Juo et al. |
| 2008/0036940 A1 | 2/2008 | Song et al. |
| 2008/0042554 A1 | 2/2008 | Komoto et al. |
| 2008/0043463 A1 | 2/2008 | Park et al. |
| 2008/0049164 A1 | 2/2008 | Jeon et al. |
| 2008/0055534 A1 | 3/2008 | Kawano |
| 2008/0068836 A1 | 3/2008 | Hatanaka et al. |
| 2008/0089064 A1 | 4/2008 | Wang |
| 2008/0094854 A1 | 4/2008 | Coleman et al. |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0158468 A1 | 7/2008 | Kim et al. |
| 2008/0165526 A1* | 7/2008 | Saraiji ............... A47F 3/001 362/125 |
| 2008/0170178 A1 | 7/2008 | Kubota et al. |
| 2008/0170400 A1 | 7/2008 | Maruyama |
| 2008/0192503 A1 | 8/2008 | Laney et al. |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2008/0295033 A1 | 11/2008 | Lee et al. |
| 2009/0002990 A1 | 1/2009 | Becker et al. |
| 2009/0009102 A1 | 1/2009 | Kahlman et al. |
| 2009/0015400 A1 | 1/2009 | Breed |
| 2009/0015755 A1 | 1/2009 | Bang et al. |
| 2009/0021461 A1 | 1/2009 | Hu et al. |
| 2009/0033612 A1 | 2/2009 | Roberts et al. |
| 2009/0058795 A1 | 3/2009 | Yamazaki |
| 2009/0061945 A1 | 3/2009 | Ma |
| 2009/0085859 A1 | 4/2009 | Song |
| 2009/0091634 A1 | 4/2009 | Kennedy et al. |
| 2009/0097227 A1 | 4/2009 | Kim et al. |
| 2009/0109165 A1 | 4/2009 | Park et al. |
| 2009/0121970 A1 | 5/2009 | Ozbek |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0178427 A1 | 7/2009 | Eichman |
| 2009/0196069 A1 | 8/2009 | Iwasaki |
| 2009/0201441 A1 | 8/2009 | Laney et al. |
| 2009/0213579 A1* | 8/2009 | Saraiji ............... A47F 3/0404 362/126 |
| 2009/0225519 A1 | 9/2009 | Mischel, Jr. et al. |
| 2009/0243501 A1 | 10/2009 | Dunn et al. |
| 2009/0244884 A1 | 10/2009 | Trulaske, Sr. |
| 2009/0278766 A1 | 11/2009 | Sako et al. |
| 2009/0284457 A1 | 11/2009 | Botzas et al. |
| 2009/0289580 A1 | 11/2009 | Dunn et al. |
| 2009/0298547 A1 | 12/2009 | Kim et al. |
| 2009/0300953 A1 | 12/2009 | Frisch et al. |
| 2010/0026912 A1 | 2/2010 | Ho |
| 2010/0039440 A1 | 2/2010 | Tanaka et al. |
| 2010/0058628 A1 | 3/2010 | Reid et al. |
| 2010/0102735 A1 | 4/2010 | Chang et al. |
| 2010/0109553 A1 | 5/2010 | Chang et al. |
| 2010/0118200 A1 | 5/2010 | Gelman et al. |
| 2010/0162747 A1 | 7/2010 | Hamel et al. |
| 2010/0165240 A1 | 7/2010 | Cho et al. |
| 2010/0189571 A1 | 7/2010 | Coonrod |
| 2010/0194296 A1 | 8/2010 | Park |
| 2010/0220258 A1 | 9/2010 | Dunn et al. |
| 2010/0231563 A1 | 9/2010 | Dunn et al. |
| 2010/0238394 A1 | 9/2010 | Dunn |
| 2010/0275477 A1 | 11/2010 | Kim |
| 2010/0293827 A1 | 11/2010 | Suss et al. |
| 2010/0307800 A1 | 12/2010 | Wee et al. |
| 2010/0309687 A1 | 12/2010 | Sampsell et al. |
| 2010/0313592 A1 | 12/2010 | Pae |
| 2011/0007228 A1 | 1/2011 | Yoon et al. |
| 2011/0013114 A1 | 1/2011 | Dunn et al. |
| 2011/0056102 A1 | 3/2011 | Reid et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0116231 A1 | 5/2011 | Dunn et al. |
| 2011/0141724 A1 | 6/2011 | Erion |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |

(56) References Cited

U.S. PATENT DOCUMENTS

| | | |
|---|---|---|
| 2011/0261282 A1 | 10/2011 | Jean et al. |
| 2011/0283199 A1 | 11/2011 | Schuch et al. |
| 2011/0302944 A1 | 12/2011 | Howington et al. |
| 2012/0020560 A1 | 1/2012 | Zarubinsky |
| 2012/0050958 A1 | 3/2012 | Sanford et al. |
| 2012/0062080 A1 | 3/2012 | Maslen |
| 2012/0062819 A1 | 3/2012 | Dunn et al. |
| 2012/0086344 A1 | 4/2012 | Schuch |
| 2012/0098794 A1 | 4/2012 | Kleinert et al. |
| 2012/0105424 A1 | 5/2012 | Lee et al. |
| 2012/0105428 A1 | 5/2012 | Fleck et al. |
| 2012/0134139 A1 | 5/2012 | Jang et al. |
| 2012/0154712 A1 | 6/2012 | Yu et al. |
| 2012/0206500 A1 | 8/2012 | Koprowski et al. |
| 2012/0206941 A1 | 8/2012 | He |
| 2012/0212520 A1 | 8/2012 | Matsui et al. |
| 2012/0212956 A1 | 8/2012 | Chen |
| 2012/0242926 A1 | 9/2012 | Hsu et al. |
| 2012/0250329 A1 | 10/2012 | Suehiro et al. |
| 2012/0268951 A1 | 10/2012 | Li |
| 2012/0274882 A1 | 11/2012 | Jung |
| 2012/0285089 A1 | 11/2012 | Artwohl et al. |
| 2012/0287368 A1 | 11/2012 | Que et al. |
| 2012/0287379 A1 | 11/2012 | Koike |
| 2012/0299891 A1 | 11/2012 | Fujiwara et al. |
| 2012/0314447 A1 | 12/2012 | Huang |
| 2012/0327039 A1 | 12/2012 | Kukulj |
| 2013/0016080 A1 | 1/2013 | Dunn et al. |
| 2013/0016296 A1 | 1/2013 | Fujita et al. |
| 2013/0027633 A1 | 1/2013 | Park et al. |
| 2013/0063326 A1 | 3/2013 | Riegel |
| 2013/0063676 A1 | 3/2013 | Tsuchihashi et al. |
| 2013/0094160 A1 | 4/2013 | Narumi |
| 2013/0120815 A1 | 5/2013 | Aspnes et al. |
| 2013/0151006 A1 | 6/2013 | Garson et al. |
| 2013/0158703 A1 | 6/2013 | Lin et al. |
| 2013/0163277 A1 | 6/2013 | Kim et al. |
| 2013/0208447 A1 | 8/2013 | Maslen |
| 2013/0211583 A1 | 8/2013 | Borra |
| 2013/0258659 A1 | 10/2013 | Erion |
| 2013/0265525 A1 | 10/2013 | Dunn et al. |
| 2013/0271674 A1 | 10/2013 | Liu et al. |
| 2013/0271696 A1 | 10/2013 | Dunn |
| 2013/0278868 A1 | 10/2013 | Dunn et al. |
| 2013/0279154 A1 | 10/2013 | Dunn |
| 2014/0016355 A1 | 1/2014 | Ajichi |
| 2014/0062316 A1 | 3/2014 | Tischler et al. |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0137065 A1 | 5/2014 | Feng et al. |
| 2014/0144083 A1* | 5/2014 | Artwohl ............... G09F 23/065 49/70 |
| 2014/0160365 A1 | 6/2014 | Kwong et al. |
| 2014/0204452 A1 | 7/2014 | Branson |
| 2014/0268657 A1 | 9/2014 | Dunn et al. |
| 2014/0285477 A1 | 9/2014 | Cho et al. |
| 2014/0285732 A1 | 9/2014 | Tanabe et al. |
| 2014/0300979 A1 | 10/2014 | Tomida et al. |
| 2014/0320950 A1 | 10/2014 | Saxe et al. |
| 2014/0333541 A1 | 11/2014 | Lee et al. |
| 2014/0340375 A1 | 11/2014 | Dunn et al. |
| 2014/0361969 A1 | 12/2014 | Wasinger et al. |
| 2015/0009653 A1 | 1/2015 | Dunn et al. |
| 2015/0035432 A1 | 2/2015 | Kendall et al. |
| 2015/0153506 A1 | 6/2015 | Dunn |
| 2015/0172385 A1 | 6/2015 | Kuroyama et al. |
| 2015/0177480 A1 | 6/2015 | Bullock et al. |
| 2015/0219954 A1 | 8/2015 | Kubo |
| 2015/0226996 A1 | 8/2015 | Ohashi |
| 2015/0245443 A1 | 8/2015 | Dunn et al. |
| 2015/0247968 A1 | 9/2015 | Verrat-Debailleul et al. |
| 2015/0250021 A1 | 9/2015 | Stice et al. |
| 2015/0253612 A1 | 9/2015 | Hasegawa et al. |
| 2015/0300628 A1 | 10/2015 | Dunn et al. |
| 2015/0309263 A2 | 10/2015 | Abovitz et al. |
| 2015/0338715 A1 | 11/2015 | Schaefer et al. |
| 2015/0346525 A1 | 12/2015 | Wolf et al. |
| 2015/0362667 A1 | 12/2015 | Dunn |
| 2015/0362768 A1 | 12/2015 | Dunn |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037606 A1 | 2/2016 | Dunn et al. |
| 2016/0037657 A1 | 2/2016 | Yoshizumi |
| 2016/0061514 A1 | 3/2016 | Seo et al. |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |
| 2016/0192451 A1 | 6/2016 | Dunn et al. |
| 2016/0238876 A1 | 8/2016 | Dunn et al. |
| 2016/0300549 A1 | 10/2016 | Zhang |
| 2016/0334666 A1 | 11/2016 | Liu |
| 2016/0335705 A1 | 11/2016 | Williams et al. |
| 2016/0338181 A1 | 11/2016 | Schuch et al. |
| 2016/0338182 A1 | 11/2016 | Schuch et al. |
| 2016/0351133 A1 | 12/2016 | Kim et al. |
| 2016/0358538 A1 | 12/2016 | Schuch et al. |
| 2017/0010771 A1 | 1/2017 | Bernstein et al. |
| 2017/0046991 A1 | 2/2017 | Riegel |
| 2017/0053456 A1 | 2/2017 | Cho et al. |
| 2017/0059938 A1 | 3/2017 | Brown et al. |
| 2017/0068042 A1 | 3/2017 | Dunn et al. |
| 2017/0068044 A1 | 3/2017 | Dunn |
| 2017/0099960 A1 | 4/2017 | Dunn et al. |
| 2017/0108735 A1 | 4/2017 | Dunn |
| 2017/0228770 A1 | 8/2017 | Dunn |
| 2017/0248823 A1 | 8/2017 | Dunn et al. |
| 2017/0256115 A1 | 9/2017 | Diaz |
| 2017/0329078 A1 | 11/2017 | Dunn et al. |
| 2018/0012526 A1 | 1/2018 | Dunn et al. |
| 2018/0012566 A1 | 1/2018 | Lin et al. |
| 2018/0020847 A1 | 1/2018 | Dunn et al. |
| 2018/0035521 A1 | 2/2018 | Dunn et al. |
| 2018/0048849 A1 | 2/2018 | Dunn |
| 2018/0061297 A1 | 3/2018 | Schuch et al. |
| 2018/0151097 A1 | 5/2018 | Dunn |
| 2018/0368240 A1 | 12/2018 | Dunn et al. |
| 2019/0079335 A1 | 3/2019 | Dunn et al. |
| 2019/0125102 A1 | 5/2019 | Dunn et al. |
| 2019/0154909 A1 | 5/2019 | Dunn |
| 2019/0155103 A1 | 5/2019 | Brown et al. |
| 2019/0205922 A1 | 7/2019 | Dunn |
| 2019/0362585 A1 | 11/2019 | Diaz |

FOREIGN PATENT DOCUMENTS

| | | |
|---|---|---|
| AU | 2015277337 B2 | 9/2018 |
| AU | 2017225781 B2 | 7/2019 |
| AU | 2018219976 B2 | 11/2019 |
| AU | 2017293369 B2 | 3/2020 |
| CA | 2536130 A1 | 5/2005 |
| CA | 2688214 A1 | 11/2008 |
| CA | 2815355 A1 | 5/2012 |
| CA | 2952619 C | 4/2019 |
| CA | 3007799 C | 9/2019 |
| CA | 3007801 C | 9/2019 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| CN | 101949526 A | 1/2011 |
| CN | 202815379 U | 3/2013 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| EP | 3023975 A1 | 5/2016 |
| EP | 3155607 A1 | 4/2017 |

(56) References Cited

FOREIGN PATENT DOCUMENTS

| | | |
|---|---|---|
| EP | 3422907 | 1/2019 |
| EP | 3155607 B1 | 4/2019 |
| EP | 3481561 A1 | 5/2019 |
| EP | 3550547 A1 | 10/2019 |
| GB | 153110 | 11/1920 |
| GB | 2232520 A | 12/1990 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2004325629 A | 11/2004 |
| JP | 2005-224267 A | 8/2005 |
| JP | 2005228996 A | 8/2005 |
| JP | 2005236469 | 9/2005 |
| JP | 2005-292939 A | 10/2005 |
| JP | 2008518251 A | 10/2005 |
| JP | 2005-332253 A | 12/2005 |
| JP | 2006-126379 A | 5/2006 |
| JP | 2006-198344 A | 8/2006 |
| JP | 2007080872 A | 3/2007 |
| JP | 2009535723 A5 | 5/2007 |
| JP | 200876755 A | 4/2008 |
| JP | 2008112719 A | 5/2008 |
| JP | 2008180502 A | 8/2008 |
| JP | 2008256819 A | 10/2008 |
| JP | 2008299660 A | 12/2008 |
| JP | 2009036964 A | 2/2009 |
| JP | 2009512898 A | 3/2009 |
| JP | 2009231473 A | 10/2009 |
| JP | 2010-54718 A | 3/2010 |
| JP | 2010509622 A | 3/2010 |
| JP | 3158578 U | 4/2010 |
| JP | 2010171010 A | 8/2010 |
| JP | 2010527100 A | 8/2010 |
| JP | 2010-273935 A | 12/2010 |
| JP | 2010282109 A | 12/2010 |
| JP | 2011081424 A | 4/2011 |
| JP | 2012-53875 A | 3/2012 |
| JP | 5173088 B1 | 1/2013 |
| JP | 2014-71343 A | 4/2014 |
| JP | 2014071343 A | 4/2014 |
| JP | 2015-231454 A | 12/2015 |
| JP | 2017531198 A | 10/2017 |
| JP | 2019-66874 A | 4/2019 |
| JP | 2019-513251 A | 5/2019 |
| KR | 20-0286961 Y1 | 8/2002 |
| KR | 1020040045939 A | 6/2004 |
| KR | 1020070003755 A | 2/2006 |
| KR | 20070005637 A | 1/2007 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 10-2011-0040909 A | 4/2011 |
| KR | 1020110119360 A | 11/2011 |
| KR | 1020120044874 A | 5/2012 |
| KR | 10-2012-0081330 A | 7/2012 |
| KR | 10-2013-0003384 A | 1/2013 |
| KR | 1020050033986 A | 4/2014 |
| KR | 10-2015-0128134 A | 11/2015 |
| KR | 101796718 A | 11/2017 |
| KR | 10-1987410 B1 | 6/2019 |
| KR | 10-2047032 B1 | 11/2019 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | WO2005093703 A1 | 10/2005 |
| WO | WO2006001559 A1 | 1/2006 |
| WO | WO2006055873 A2 | 5/2006 |
| WO | WO2006109237 A1 | 10/2006 |
| WO | WO2007052777 A1 | 5/2007 |
| WO | WO2005040873 A | 5/2008 |
| WO | WO2008138049 A | 11/2008 |
| WO | WO2008152832 A1 | 12/2008 |
| WO | WO2009004574 A1 | 1/2009 |
| WO | WO2010080624 | 7/2010 |
| WO | WO2010116202 A1 | 10/2010 |
| WO | WO2010129271 A2 | 11/2010 |
| WO | WO2011100429 A2 | 8/2011 |
| WO | WO2011143719 | 11/2011 |
| WO | WO2013056109 A1 | 4/2013 |
| WO | WO2014006490 A1 | 1/2014 |
| WO | WO2014/034546 A1 | 3/2014 |
| WO | WO2014158642 A1 | 10/2014 |
| WO | WO2015003130 A1 | 1/2015 |
| WO | WO2015195681 A1 | 12/2015 |
| WO | WO2016021751 A1 | 2/2016 |
| WO | WO2017151934 A1 | 9/2017 |
| WO | WO2018009399 A1 | 1/2018 |
| WO | WO2018031753 A1 | 2/2018 |

OTHER PUBLICATIONS

Pilkington Tec Glass, For the Refrigeration Market, 2002, 2 Pages.
Wikipedia, Gradient-index optics, 2016.
Patrick Frantz & Deania Fernandez, Printed Circuit Boards (PCBs), Feb. 18, 2004, 2 Pages, Version 1.1.
Teravision Corp., LCD-TV Panel Control Board Specification, Nov. 2007, 24 Pages.
Supertex Inc., Constant Off-time, Buck-based LED Drivers Using HV9910, Nov. 2, 2004, 4 Pages.
Grin Tech, Grin Lenses, Aug. 25, 2016, 4 Pages.
Supertex Inc., Universal High Brightness LED Driver, 2007, 8 Pages.
Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.
Panel-Brite, Inc., High Brightness LED Backlight Technology, Mar. 11, 2009, 1 Page.
RPO, How Digital Waveguide Touch Works, Sep. 15, 2011, 1 Page.
Dave Roos, How Transmissive Film Works, article, 2008, 9 pages.
Schott, Glass made of Ideas—OPALIKA, 2016, 2 pages.
Anandan, LED Backlight: Enhancement of picture quality on LCD screen, Oct. 8-12, 2006, 5 pages.
Lu, Color shift reduction of a multi-domain IPS-LCD using RGB-LED backlight, 2006, 10 pages.
Anandan, M., Progress of LED backlights for LCDs, Journal of the SID, 2008, pp. 287-310, 16/2.

* cited by examiner

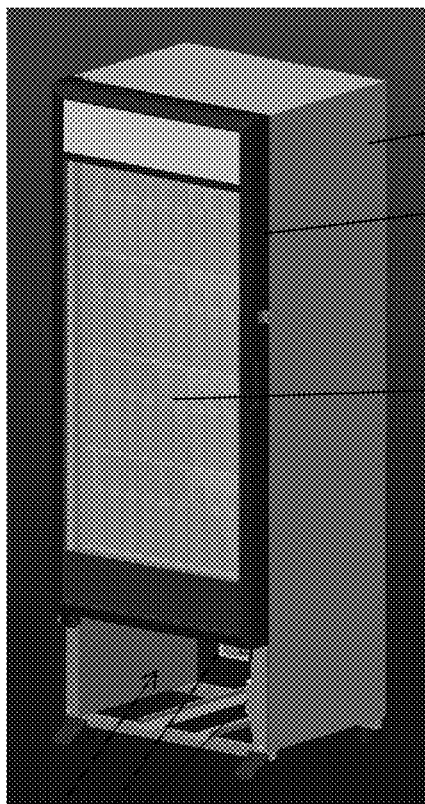
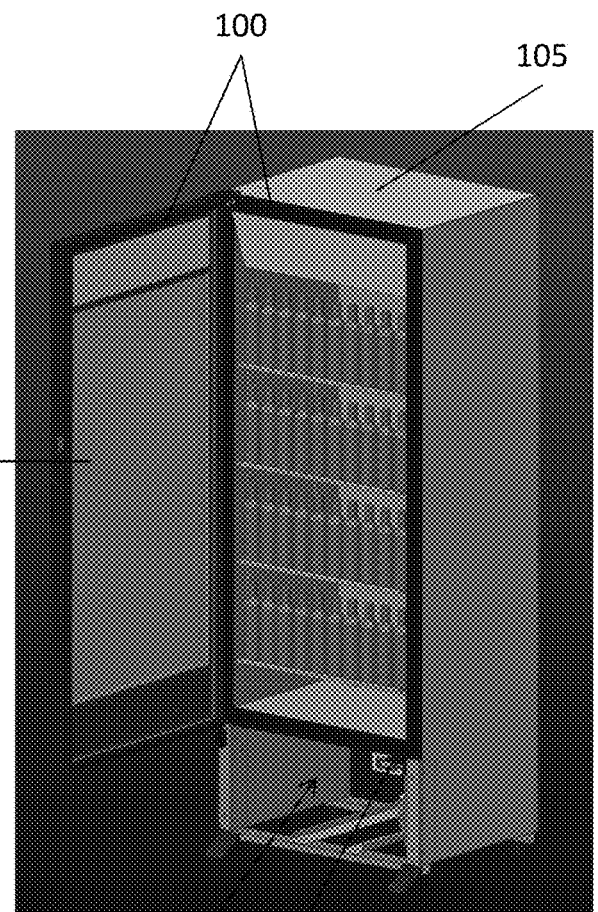
FIG - 1
FIG - 2

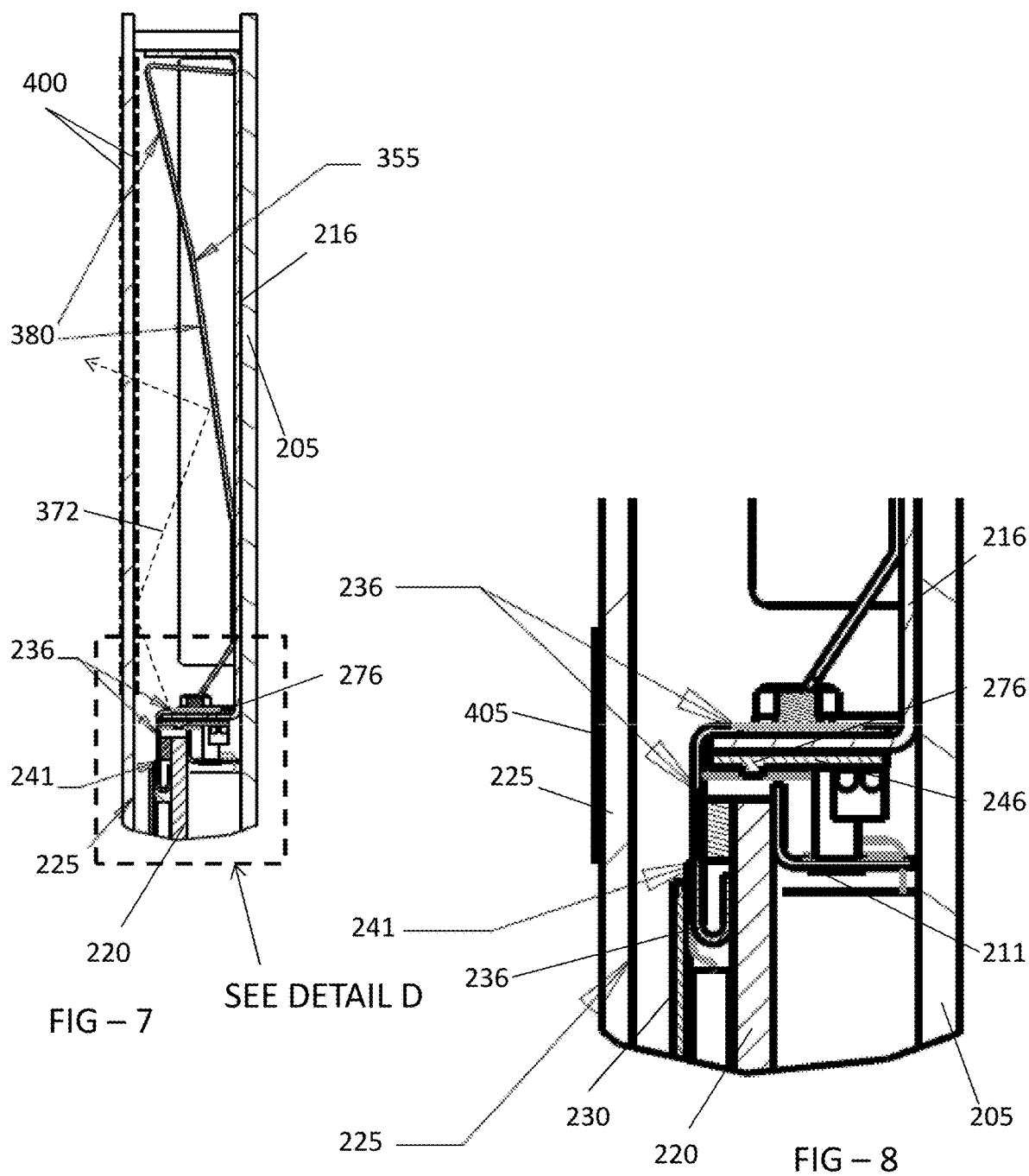

LIGHTING ASSEMBLY FOR ELECTRONIC DISPLAY AND GRAPHIC

CROSS-REFERENCE TO RELATED APPLICATIONS

This application is a continuation of U.S. application Ser. No. 14/878,679 filed Oct. 8, 2015, which claims the benefit of U.S. Application No. 62/061,512 filed on Oct. 8, 2014, the disclosures of each of which are hereby incorporated by reference in their entireties.

TECHNICAL FIELD

Embodiments generally relate to lighting assemblies for transparent electronic displays.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides an LED assembly for a transparent LCD assembly. LEDs are preferably arranged along the top and bottom edges of a two way light guide which permits the light to exit both the front and rear surface of the light guide. The top LEDs are preferably placed in thermal communication with a top thermal plate which is placed in conductive thermal communication with the rear glass. Similarly, the bottom LEDs are preferably placed in thermal communication with a bottom thermal plate which is also placed in conductive thermal communication with the rear glass. The light guide is preferably sandwiched between a front and rear bracket but is permitted to float up/down or left/right (as one observes the image on the LCD) to account for thermal expansion/contraction of the light guide.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 1 is a perspective view of a refrigerated display case having an exemplary sealed transparent LCD assembly.

FIG. 2 is a perspective view of the refrigerated display case of FIG. 1 where the door has been opened.

FIG. 7 is a detailed section view of Detail A shown in FIG. 5.

FIG. 8 is a detailed section view of Detail D shown in FIG. 7.

DETAILED DESCRIPTION

Figure 3:
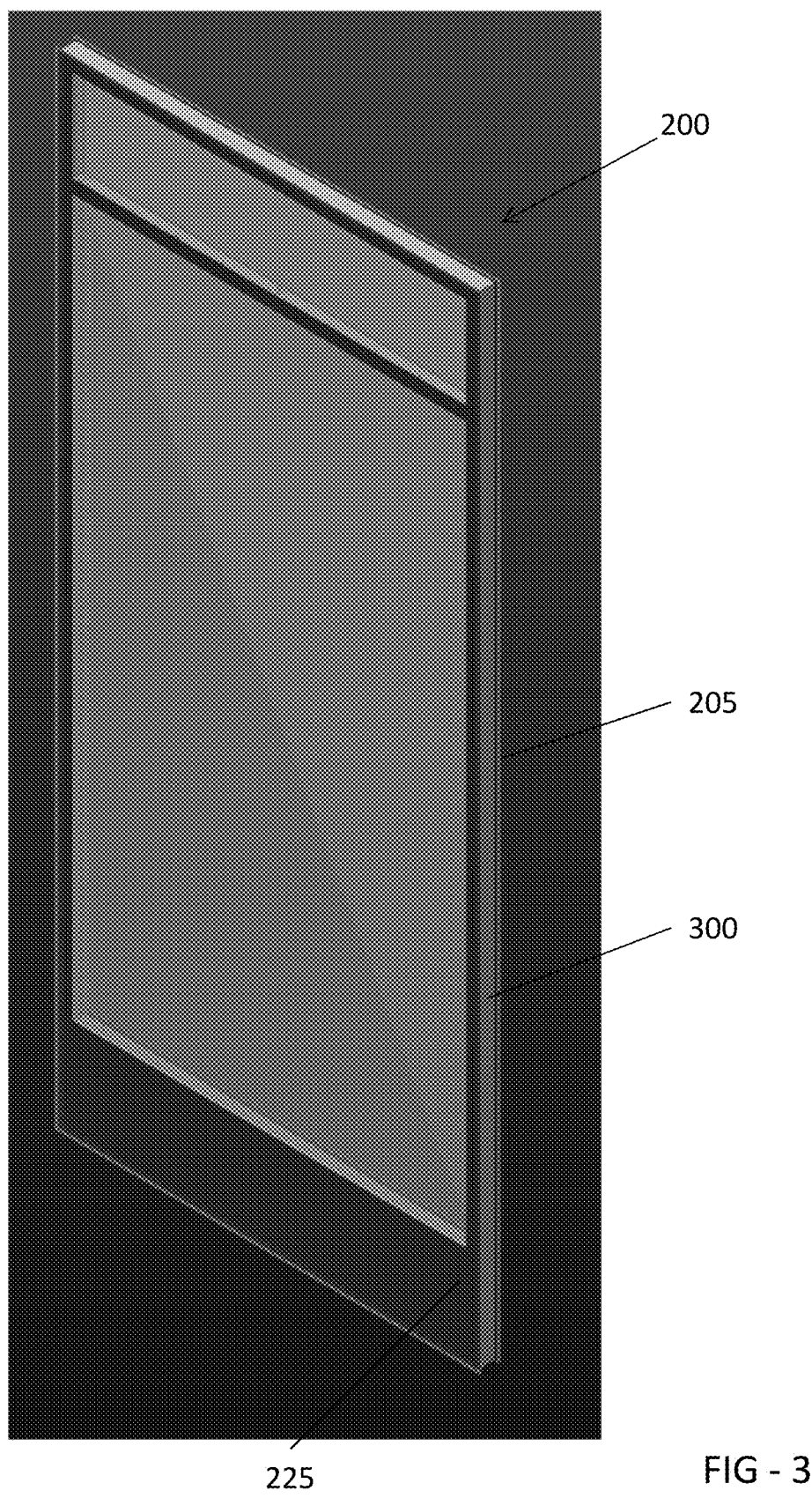
FIG. 3 is a perspective view of the sealed transparent LCD assembly of FIGS. 1-2.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a refrigerated display case having an exemplary sealed transparent LCD assembly 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: timing and control board (TCON), video player, hard drive/storage, microprocessor/CPU, wireless transmitter/receiver, cellular data transmitter/receiver, and internet connectivity. At least some of the electrical devices 111 are in electrical communication with the transparent LCD 200.

FIG. 2 is a perspective view of the refrigerated display case of FIG. 1 where the door has been opened.

FIG. 3 is a perspective view of the sealed transparent LCD assembly 200 of FIGS. 1-2. Generally speaking, the assembly includes a spacer 300 which is sandwiched between a front glass 225 and rear glass 205. These components are preferably sealed together with an inert gas filling the sealed enclosure. Although not required for every embodiment, argon gas has been found to be preferred in the exemplary embodiments. For sealing these components together, it is preferable to use a hot melt polyurethane. Preferably, the spacer 300 is the Super Spacer® Standard from Quanex in Cambridge, Ohio. www.quanex.com. In an exemplary embodiment, the spacer 300 would be a flexible foam that contains a desiccant and has a pressure sensitive acrylic adhesive on the front and back edges of the spacer which would be used to bond with the front and rear glass.

Figure 4:
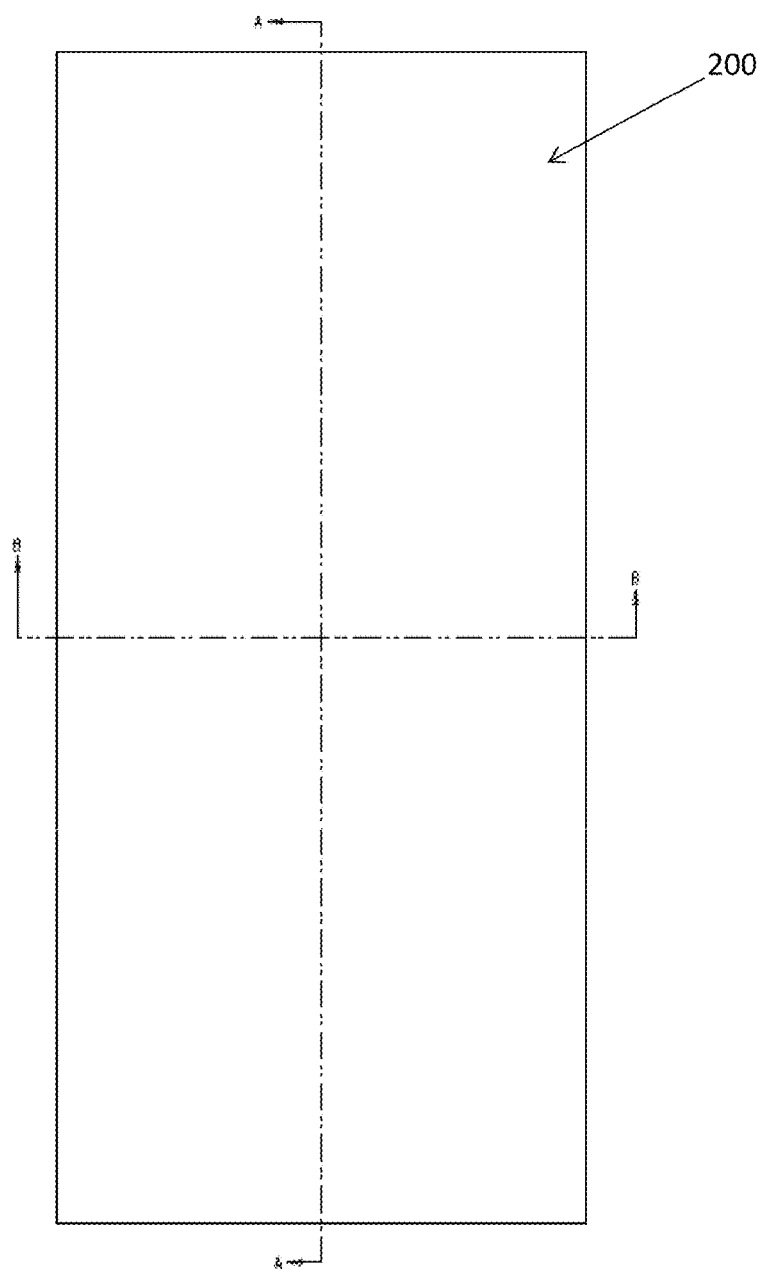
FIG. 4 is a front planar view of the sealed transparent LCD assembly, showing the section lines A-A and B-B.
Figure 5:
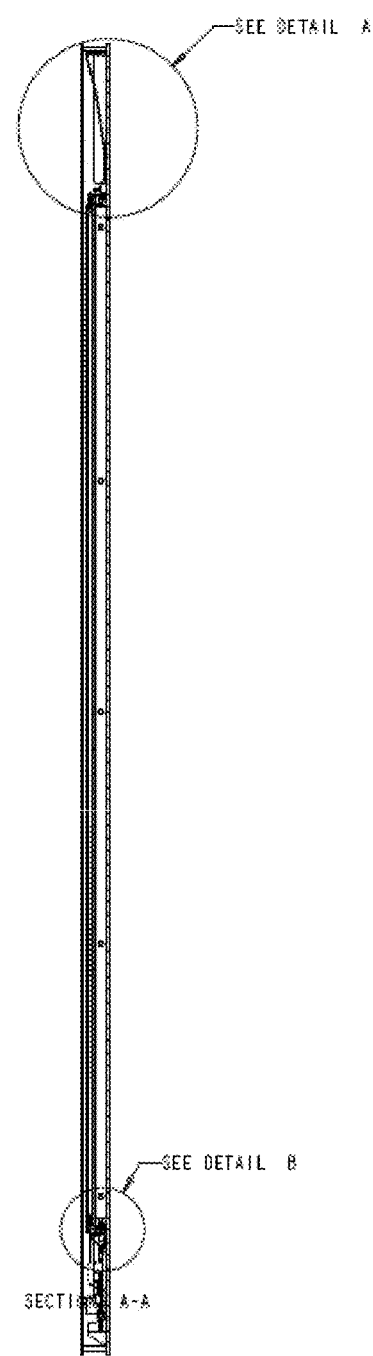
FIG. 5 is a section view taken along the section line A-A shown in FIG. 4 and indicating Detail A and Detail B.
Figure 6:
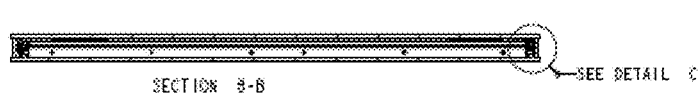
FIG. 6 is a section view taken along the section line B-B shown in FIG. 4 and indicating Detail C.

FIG. 4 is a front planar view of the sealed transparent LCD assembly 200, showing the section lines A-A and B-B. FIG. 5 is a section view taken along the section line A-A shown in FIG. 4 and indicating Detail A and Detail B. FIG. 6 is a section view taken along the section line B-B shown in FIG. 4 and indicating Detail C.

FIG. 7 is a detailed section view of Detail A shown in FIG. 5 while FIG. 8 is a detailed view of Detail D shown in FIG. 7. A top thermal plate 216 is preferably bonded to the rear glass 205. In an exemplary embodiment, the top thermal plate 216 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 246 containing a plurality of LEDs 276 is preferably attached to the top thermal plate 216 and is preferably in conductive thermal communication with the top thermal plate 216 as well. In this way, heat that is generated by the LEDs 276 can be transmitted to the PCB 246, top thermal plate 216, and eventually transferring to the rear glass 205 where the heat can dissipate through natural or forced convection.

The LEDs 276 are placed adjacent to the edge of a light guide 220 which is sandwiched between a rear bracket 211 and a front bracket 236. Generally speaking, the light guide 220 is only constrained from movement towards the front or back of the assembly, but is not constrained from movement towards the top or sides of the assembly. In other words, the light guide 220 should be secured such that it is capable of thermal expansion/contraction in the X-Y direction (horizontal and vertical when observing the LCD), but is fixed in the Z direction (into/out of the assembly when observing the LCD). It could also be said that the light guide 220 is preferably constrained so that it cannot move towards the front or rear glass but otherwise is permitted to float between the rear bracket 211 and front bracket 236. In an exemplary embodiment, the light guide 220 would be the Acrylite® LED Endlighten product available from Evonik Industries. www.acrylite-shop.com.

Preferably, the light guide 220 would contain microscopic diffuse particulate that is homogeneously scattered throughout the sheet. Also preferably, the light emitted from the LEDs 276 and 275 is permitted to exit both the front and rear surfaces of the light guide 220 (in this way, the light guide 220 could be referred to as a 'two way light guide'). In an exemplary embodiment, the light is permitted to exit the rear of the light guide 220 so as to illuminate the products within the display case. Thus, it is preferable that the amount of light permitted to exit the rear surface of the light guide 220 is at least 20% of the amount of light permitted to exit the front surface of the light guide 220.

The transparent LCD 230 is preferably attached to a front surface of the front bracket 236 through a layer of adhesive 241 which would preferably be applied around the perimeter of the LCD 230. In an exemplary embodiment, the adhesive 241 would be VHB tape and preferably 5052 VHB Tape available commercially from 3M™ of St. Paul, Minn. www.3M.com.

Figure 10:
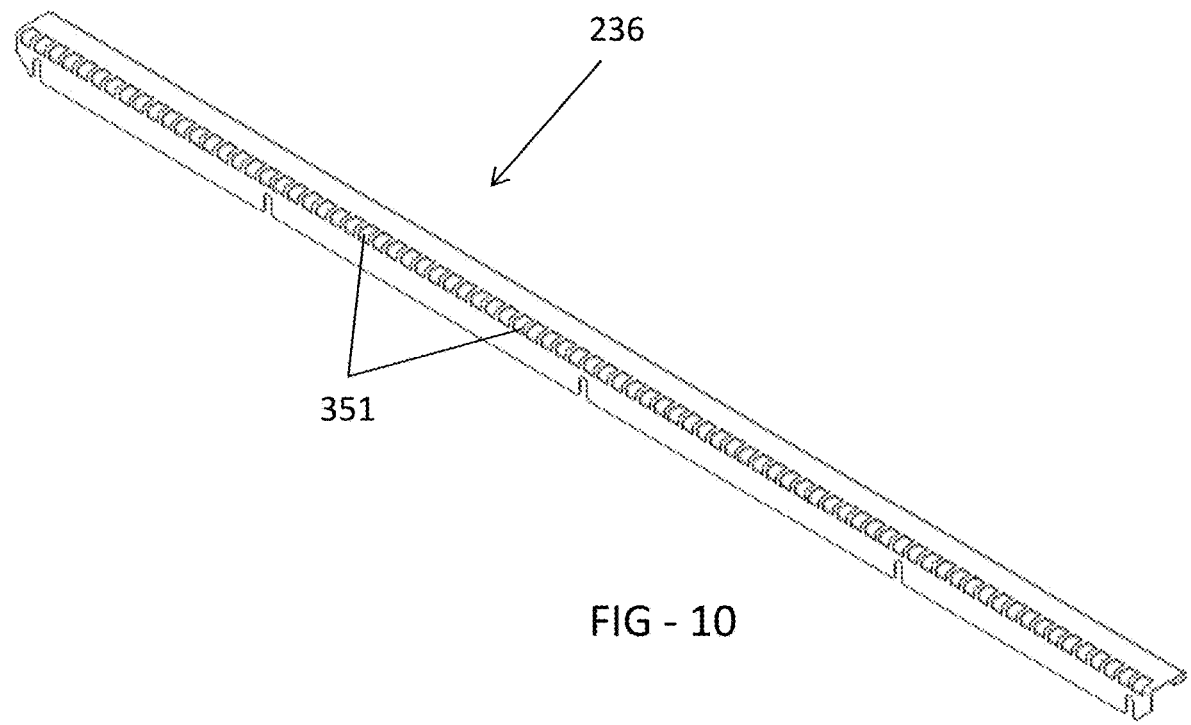
FIG. 10 is a perspective view of an exemplary embodiment of a front bracket when using the optional light bleeding technique.

In an exemplary embodiment, the front bracket 236 may contain a plurality of apertures 351 (see FIG. 10) which permit light 372 from the LEDs 276 to pass through the front bracket 236 and enter the area above the front bracket 236. In this way, some light from the LED 276 is permitted to enter a top cavity of the sealed transparent LCD assembly. The cavity may be defined by the space between a rear wall 355 and the front glass 225. The light 372 is permitted to reflect off the rear wall 355 and exit through the front glass 225. In some embodiments, a static graphic 400 may be placed on the front glass 225 (either the front surface or the rear surface) such that the light 372 which eventually exits out of the front glass 225 can illuminate the graphic 400. Thus, the apertures 351 which are contained within the front bracket 236 may allow the light 372 from the LED 276 to bleed off the main light guide 220 and be used to backlight the graphic 400. Preferably, the front surfaces 380 of the rear wall 355 are reflective.

A dark colored mask 405 may be applied to the front glass 225 to ensure that the light 372 from the LED 276 is not directly visible to an observer. The dark colored mask 405 is preferably black and may be bonded to either the interior or exterior surface of the front glass 225. Preferably, the mask 405 is placed along the line of sight of an intended observer who observes the LED 276, where the mask 405 is positioned between the intended observer and the LED 276.

Figure 9:
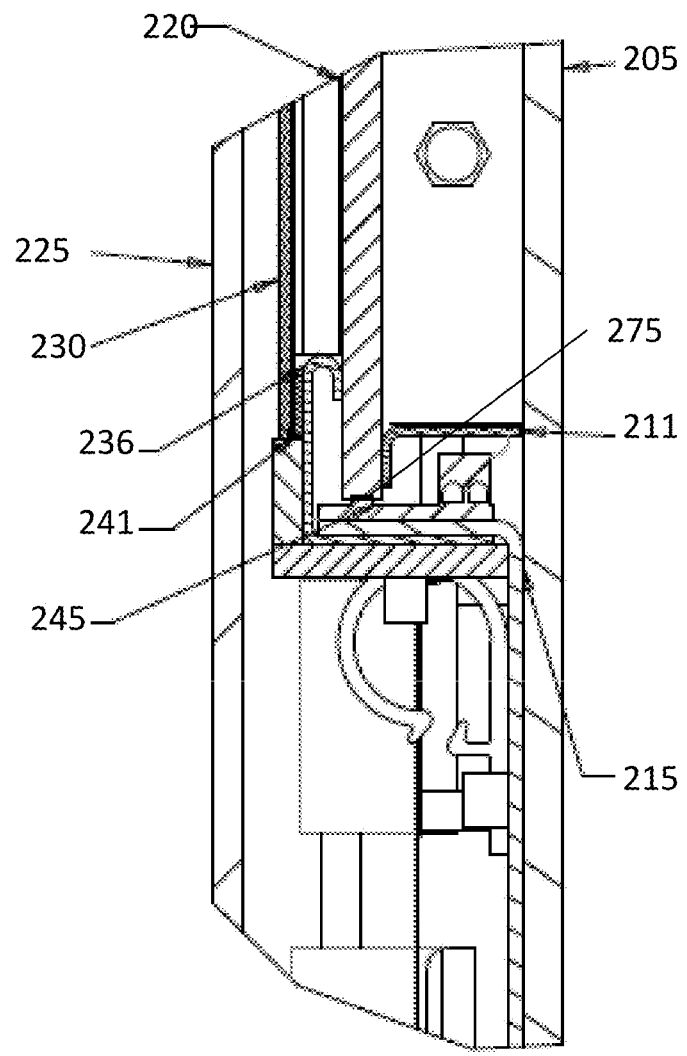
FIG. 9 is a detailed section view of Detail B shown in FIG. 5.

FIG. 9 is a detailed section view of Detail B shown in FIG. 5. A bottom thermal plate 215 is preferably bonded to the rear glass 205. In an exemplary embodiment, the bottom thermal plate 215 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 245 containing a plurality of LEDs 275 is preferably attached to the bottom thermal plate 215 and is preferably in conductive thermal communication with the bottom thermal plate 215 as well.

In this way, heat that is generated by the LEDs 275 can be transmitted to the PCB 245, bottom thermal plate 215, and eventually transferring to the rear glass 205 where the heat can dissipate through natural or forced convection.

The LEDs 275 are placed adjacent to the edge of a light guide 220 which is sandwiched between a rear bracket 211 and a front bracket 236. As discussed at length above, the light guide 220 is preferably only constrained from movement towards the front or back of the assembly, but is not contained from movement towards the top or sides of the assembly. It should be noted that the front bracket 236 could also contain the apertures 351 so that light from the LED 275 may bleed into the cavity below front bracket 236, in order to illuminate a graphic that could be placed on the front glass 225 below the front bracket 236. While not shown here, static graphics could also be placed below the front bracket 236 with a rear wall 355 similar to what is shown and described above with reference to FIG. 7.

Figure 11:
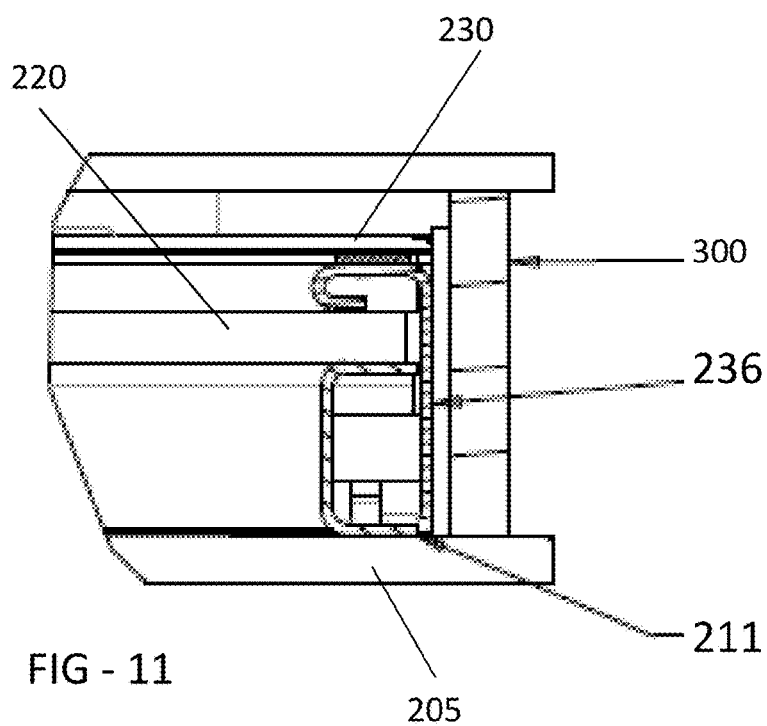
FIG. 11 is a detailed section view of Detail C shown in FIG. 6.

FIG. 11 is a detailed section view of Detail C shown in FIG. 6.

Figure 12:
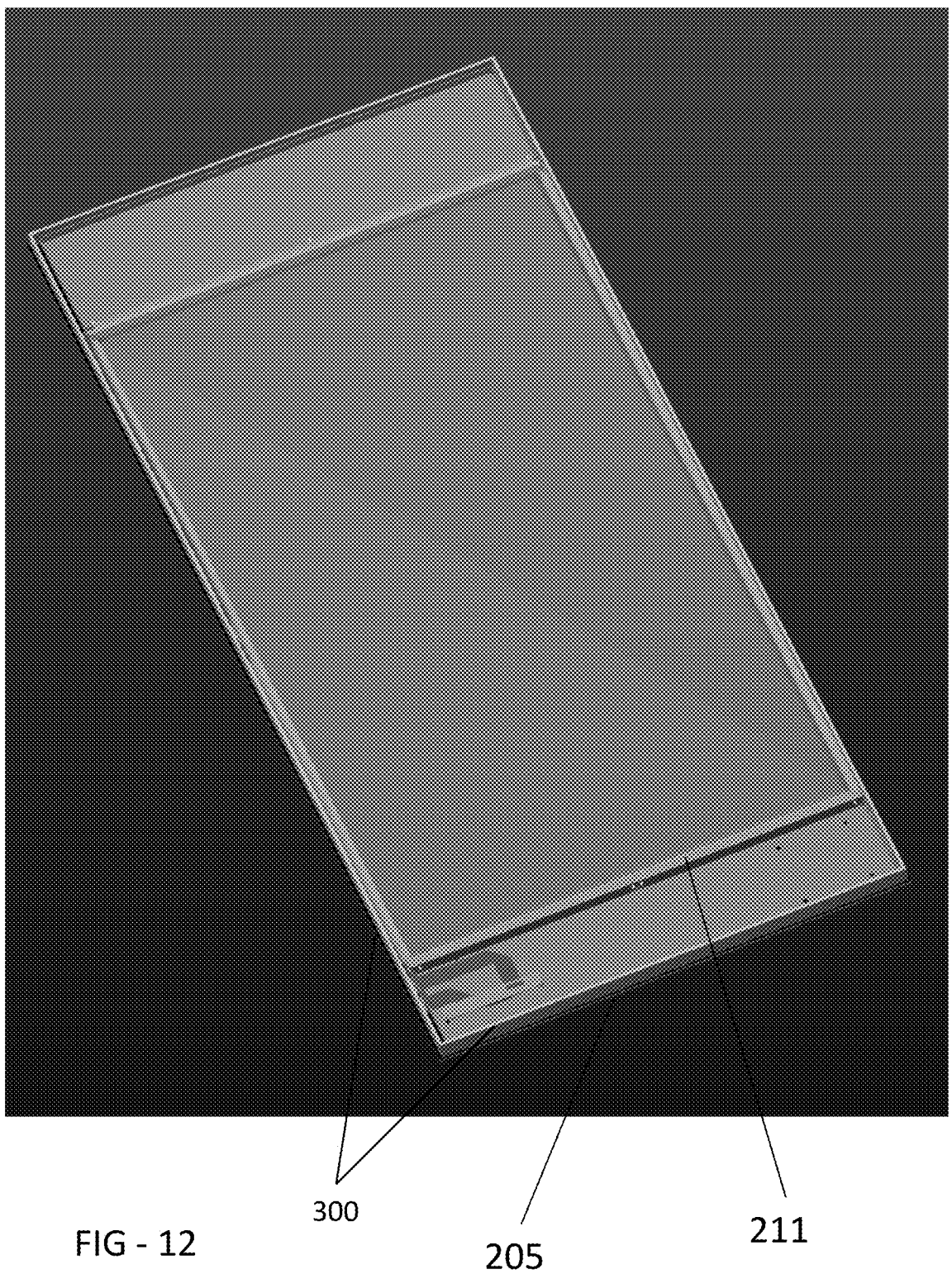
FIG. 12 is a perspective view of a partially assembled exemplary embodiment of a sealed transparent LCD assembly.

FIG. 12 is a perspective view of a partially assembled exemplary embodiment of a sealed transparent LCD assembly. This view shows the rear glass 205 with the spacer 300 attached around the perimeter of the glass 205. Also shown is the rear bracket 211 which is attached to the rear glass 205 as well.

The embodiments of the sealed transparent LCD assembly described herein can be used with any number of display case designs, either temperature controlled or not, and with doors that open or glass that remains stationary.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A display assembly comprising:
a front cover layer;
a rear cover layer;
an electronic display layer positioned between the front cover layer and the rear cover layer, wherein said front cover layer is configured to permit viewing of images displayed at the electronic display layer through the front cover layer;
lighting elements positioned to provide illumination for said electronic display layer when powered; and
a cavity positioned vertically above an upper edge of said electronic display layer or below a lower edge of said electronic display layer and configured to receive a static poster with a printed graphic, wherein said cavity is configured to receive at least a portion of the illumination provided by the lighting elements such that both said electronic display layer and said static poster are separately illuminated when said lighting elements are powered.

2. The display assembly of claim 1 further comprising:
a light guide positioned behind the electronic display layer, wherein said lighting elements are positioned along an outer edge of the light guide, wherein the electronic display layer comprises liquid crystals, and wherein the plurality of lighting elements comprise light emitting diodes.

3. The display assembly of claim 2 wherein:
the front cover layer comprises glass; and
the rear cover layer comprises glass.

4. The display assembly of claim 2 wherein:
said electronic display layer is a transparent electronic display such that said storage cavity is visible through said electronic display layer.

5. The display assembly of claim 1 further comprising:
a reflective surface positioned within the cavity between the static poster and the rear cover layer, wherein said reflective surface is configured to direct illumination from the illumination elements to the static poster and through the front cover layer.

6. The display assembly of claim 5 further comprising:
a housing defining a storage cavity for a number of consumer products; and
an access panel movably attached to said housing, wherein the front cover layer and the rear cover layer define, at least in part, front and rear surfaces of said access panel.

7. The display assembly of claim 6 further comprising:
a refrigeration system for the housing configured to cool the number of consumer products.

8. The display assembly of claim 1 further comprising:
a thermal plate bonded to the rear cover layer and in thermal communication with the plurality of lighting elements, wherein the plurality of lighting elements are attached to the thermal plate.

9. A display case comprising:
a housing configured to hold a number of consumer products; and
a door assembly moveably attached to the storage cavity and comprising:
a front transparent layer;
a rear transparent layer;
a transparent electronic display layer configured to display images and positioned between the front transparent layer and the rear transparent layer;
a light guide positioned behind the transparent electronic display and having an outer edge;
lighting elements positioned along the outer edge of the light guide;
a cavity positioned along an edge of, and on an opposing side of the lighting elements as compared to the light guide so as to occupy a non-coextensive space relative to the transparent electronic display layer; and
a static poster comprising graphical artwork located within or adjacent to the cavity;
wherein the lighting elements are configured to, when illuminated, simultaneously emit light to both the transparent electronic display layer and the static poster such that the images displayed at the transparent electronic display and the artwork of the static poster are illuminated simultaneously.

10. The display case of claim 9 wherein:
the cavity is defined, at least in part, by the front transparent layer and the rear transparent layer.

11. The display case of claim 10 further comprising:
a bracket positioned between the cavity and the lighting elements; and
apertures located in the bracket, wherein said apertures are configured to permit light emitted from the lighting elements to pass through the bracket and into the cavity.

12. The display case of claim 9 further comprising:
a thermal plate positioned behind the static poster, wherein said thermal plate is in conductive thermal communication with the lighting elements and refrigerated air circulated within the housing.

* * * * *

UNITED STATES PATENT AND TRADEMARK OFFICE
CERTIFICATE OF CORRECTION

| | |
|---|---|
| PATENT NO. | : 11,474,393 B2 |
| APPLICATION NO. | : 16/839451 |
| DATED | : October 18, 2022 |
| INVENTOR(S) | : Diaz et al. |

It is certified that error appears in the above-identified patent and that said Letters Patent is hereby corrected as shown below:

On the Title Page

Item (56) References Cited, U.S. Patent Documents, please delete "1,299,092 A 11/1981 Ibrahim" and insert -- 4,299,092 A 11/1981 Ibrahim --.

Item (56) References Cited, U.S. Patent Documents, please delete "2003/0026085 A1 2/2003 Ueda" and insert -- 2003/0026085 A1 2/2003 Ueda et al. --.

Signed and Sealed this
Twenty-seventh Day of December, 2022

Katherine Kelly Vidal
*Director of the United States Patent and Trademark Office*